United States Patent

Draper

[15] 3,649,961
[45] Mar. 14, 1972

[54] MOTOR VEHICLE UNAUTHORIZED TAMPERING ALARM SYSTEM

[72] Inventor: Ernest William Draper, 337 Queen Street, Brisbane, Queenslands 4000, Australia

[22] Filed: Jan. 9, 1970

[21] Appl. No.: 1,576

[30] Foreign Application Priority Data

May 15, 1969 Australia .............................55084/69

[52] U.S. Cl. ...................................340/64, 307/10, 200/42
[51] Int. Cl. .....................................................G08b 13/00
[58] Field of Search ....................340/63, 64, 65; 200/42, 43, 200/44, 45; 307/10

[56] References Cited

UNITED STATES PATENTS

| 2,583,752 | 1/1952 | Smith | 340/64 |
| 2,385,285 | 9/1945 | Kolias | 340/64 |

Primary Examiner—Alvin H. Waring
Attorney—John M. Brandt

[57] ABSTRACT

An alarm system for motor vehicles comprising an electrical multicontact key switch having at least four positions, and a relay actuated by the passage of electric current through the switch, wherein current passes into an ignition circuit to provide means for effecting vehicle drive on rotation of the switch into an initial position, and on further rotation current is partially diverted into circuits which operate to raise an alarm should the vehicle be tampered with.

4 Claims, 2 Drawing Figures

INVENTOR
ERNEST WILLAM DRAPER

ATTORNEY

MOTOR VEHICLE UNAUTHORIZED ALARM SYSTEM

BACKGROUND OF THE INVENTION

1. Field of the Invention

This invention is directed to an improved safety alarm system for motor vehicles and represents a modification of the alarm system already disclosed in the specification accompanying Australian patent application No. 43,370/68 lodged under the name of the present inventor.

2. Description of the Prior Art

The above prior art discloses a safety alarm system for motor vehicles which consists of a three position six contact key switch coupled with means to pass current from a battery through the contacts of this switch to operate an alarm under certain electric circuit conditions.

SUMMARY OF THE INVENTION

The present specification discloses an improved form of safety alarm system for vehicles consisting of a four or more positioned multicontact key switch which serves as a means for providing added protection against unauthorized tampering with a motor vehicle.

In accordance with this invention, I provide a safety alarm system for motor vehicles comprising an electrical four or more positioned multicontact key switch, and a relay actuated by the passage of electric current from a battery through said switch, said system being characterized by the feature that on rotation of said key switch into its first position current passes into an ignition circuit to provide means for effecting vehicle drive, and on further rotation of the aforesaid switch into its advanced positions current is diverted into circuits which operate to raise an alarm should the vehicle be willfully tampered with.

This invention will now be further described by reference to the following drawings, in which:

FIG. 1 represents a circuit arrangement including a switch having four switch positions and eight contacts, representing an electrical alarm circuit appropriate for use against anyone tampering with a private vehicle; and, FIG. 2 represents a circuit arrangement including a switch having 12 switch positions and 12 contacts, representing an electrical alarm circuit appropriate for use against anyone tampering with a commercial vehicle.

DESCRIPTION OF THE PREFERRED EMBODIMENT

Figure 1:
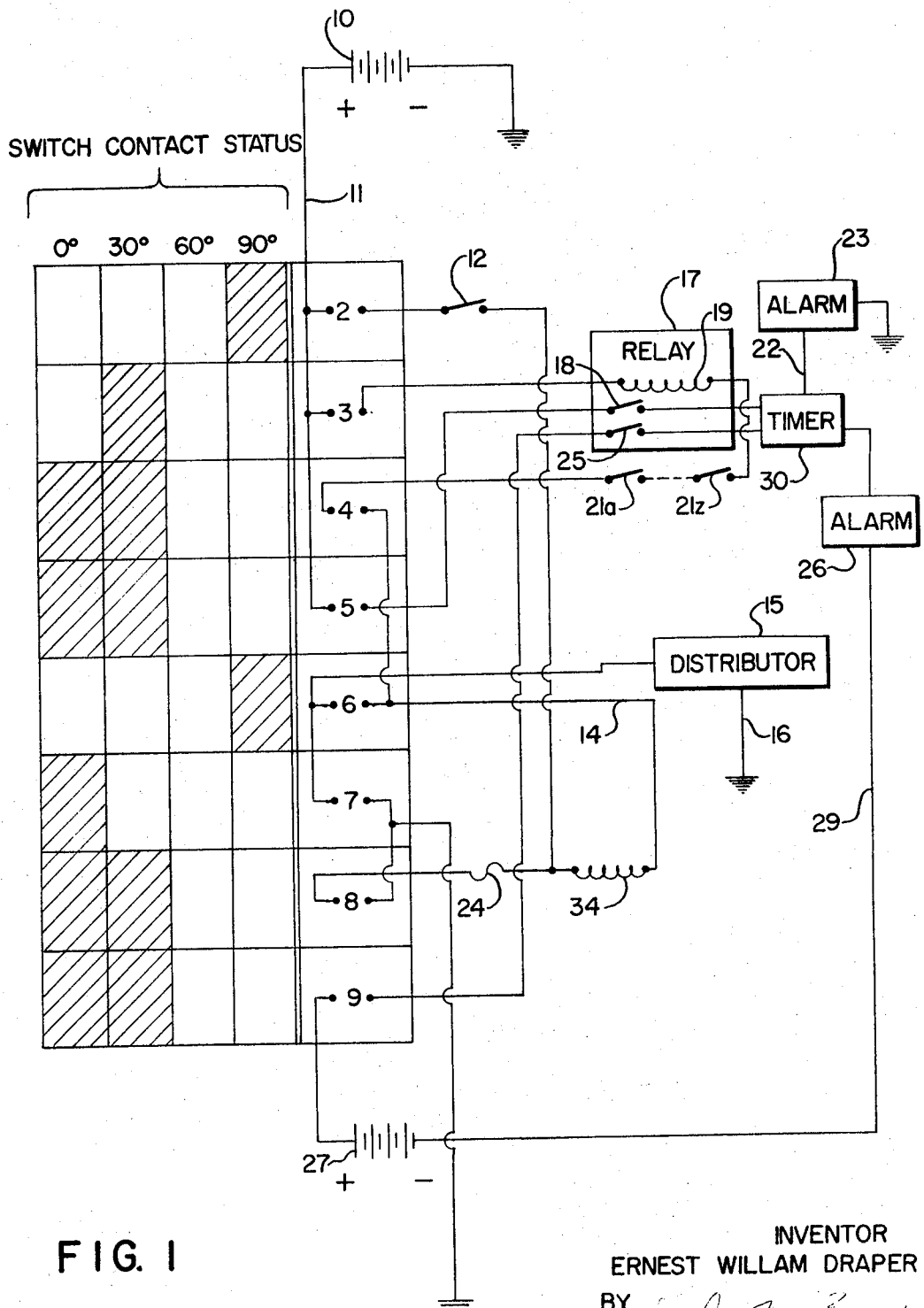

Referring now to FIG. 1, this figure denotes a key operated barrel switch with four switch positions each 30° apart, allowing the switching operation to extend from 0° to 90°, the first position being at 0°, the second at 30°, the third at 60°, and the fourth at 90°. There are eight contacts numbered 2, 3, 4, 5, 6, 7, 8, 9. A hatched block denotes a closed contact and an unhatched block denotes an open contact.

The circuit diagram also shows an automobile battery 10; a relay 17; a distributor 15; an ignition coil 34; an ignition switch 12; a dry cell 27; alarms 23 and 26; a timer 30; a fuse or circuit breaker 24; and microswitches 21a ... 21z.

With the key switch in the 90° position current passes from the battery 10, through the lead 11, the switch contact 2, to the ignition switch 12. From this switch 12 the current moves on to the ignition coil 34 and from there across the switch contact 6 to the distributor 15 passing from there to earth through the lead 16. The vehicle is now recognized as being in "drive."

With the key turned to the 30° position, the vehicle is in the "set alarm" condition. In this condition current passes from the battery 10, through the lead 11, the closed switch contact 3, to energize the relay coil 19, and thence to the microswitches 21a ... 21z. The current passing through these microswitches moves across the closed switch contact 4 to the switch contact 6 and from there passes through the ignition coil 34, the fuse or circuit breaker 24, the switch contact 8, to earth. This completes the circuit to the relay coil, and thus the relay arms 18, 25, are drawn upwards to break the circuit to the alarms 23 and 26.

The switch contacts 5 and 9 are closed in the 30° switch position. With the switch contact 5 closed, a passage of current is maintained to the relay coil circuit when the switch contact 3 becomes open circuit on turning the key to 0° to switch the circuit to the alarm condition. Switch contacts 4, 5, 8, and 9, remain closed during the turning of the key switch from the 30° position to the 0° position.

When the switch is turned into the 0° position, the contact 3 is now open with the contacts 4, 5, 7, 8, and 9 being closed. The current now passes from the battery 10 through lead 11, the switch contact 5, to the relay arm 18, the relay coil 19, and the microswitches 21a ... 21z. From the microswitches the current then passes through the closed switch 4, a contact associated with the switch 6, through the lead 14 to the ignition coil 34, and from the ignition coil it passes through the fuse or circuit breaker 24 and the switch contact 8 to earth. The relay is now energized and awaits to be deenergized by any tampering with the electrical alarm system on the vehicle.

The switch contact 7 is closed in the 0° switch position to ensure an earth potential on both sides of the distributor, and the switch contact 9 being closed in both the switch positions 30° and 0° current is passed from the auxiliary battery 27 through this switch contact 9 to the relay arm 25. The vehicle is now regarded as being in "alarm."

The alarm may be set off by opening one of the microswitches 21a ... 21z or by disconnecting the main battery 10, or short circuiting the positive side of this battery to the positive side of the ignition coil 13, or by blowing the fuse or circuit breaker 24. This causes the relay coil 19 to deenergize and the relay arms 18, 25, to drop causing current to pass from the battery 10 through the lead 11, the switch contact 5, the relay arm 18, the timer 30, to the alarm 23 to earth thereby sounding the main alarm.

On the auxiliary side current also passes from the battery 27 through the switch contact 9 to the relay arm 25, the timer 30, the alarm 26, and returning to the battery along the lead 29 to complete the circuit and causing the alarm to sound.

Any attempt to wire in a spare ignition coil to the distributor from any positive point on the vehicle will fail to start the vehicle on account of the make and break action of the distributor being disturbed due to the earth potential on the distributor existing through the closed switch contact 7. If the main battery 10 is disconnected, the auxiliary alarm 26 will continue to sound.

In a positive earthed vehicle, if a negative potential were taken from any point on the vehicle and connected to the negative terminal of the ignition coil the fuse or circuit breaker 24 would still open circuit.

Figure 2:
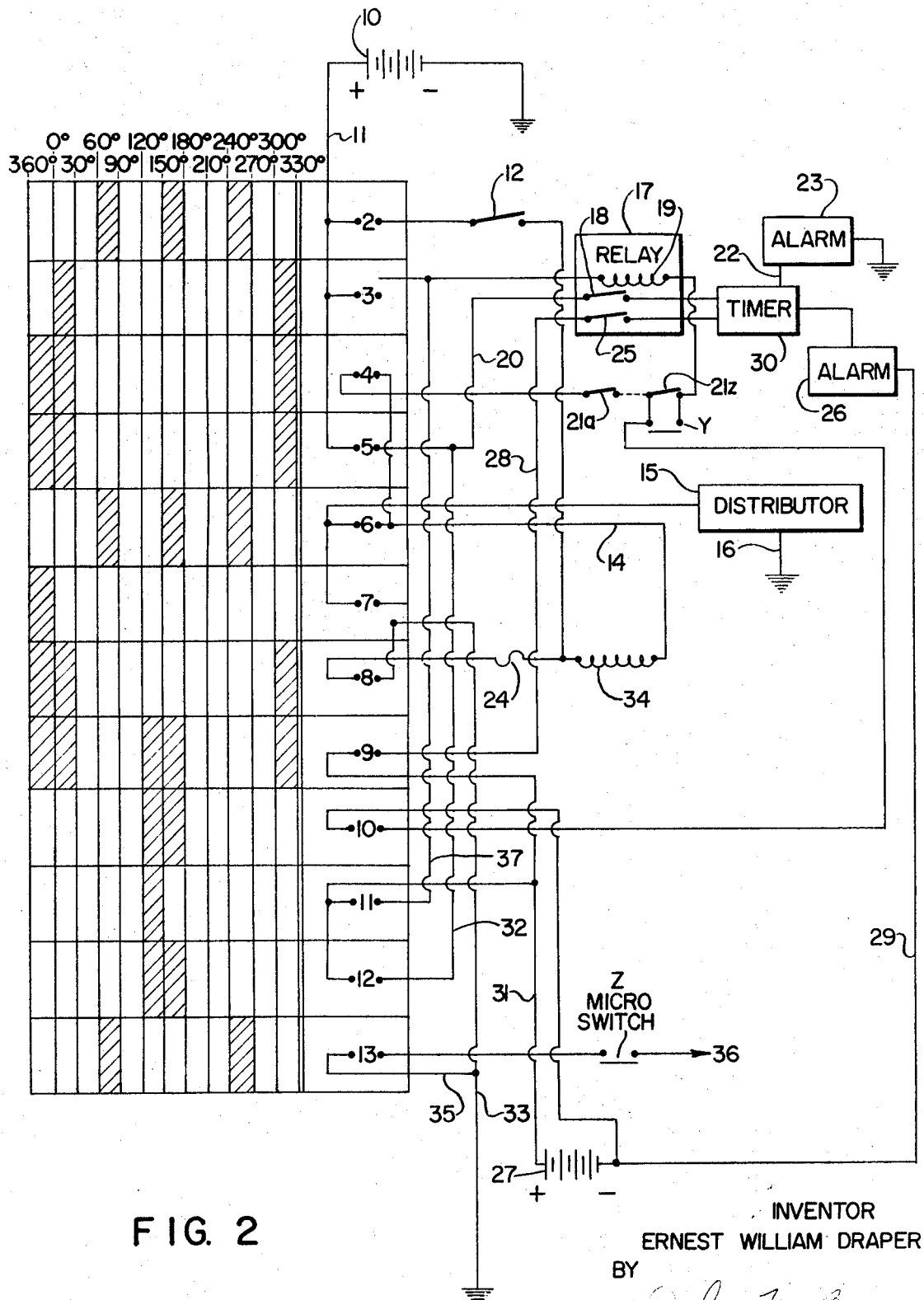

In applying this invention for the protection of a commercial vehicle reference will now be made to FIG. 2. In this figure there are shown 12 switch positions and 12 switch contacts extending around the full 360° of a barrel type switch assembly with each pair of contact points located at 30° intervals around its circumference. Unlike the construction in FIG. 1 where the key only turns within the range between 0° and 90°, the key in accordance with this further embodiment is adapted to turn for the full 360° and can be removed at two positions of its travel at 0° or 360° and 180° denoted by the terms "alarm" and "service alarm."

"Service alarm" places the vehicle in an "alarm" condition in which work can be carried out on the vehicle in regions covered by all the electrical microswitches without setting off the alarm with the exception of one single microswitch which operates the alarm if anyone starts opening the rear door of the vehicle and tampers with the goods contained therein. While in "service alarm" the vehicle can be driven normally, and any electrical maintenance can be carried out by the removal of any cables from the battery or any other apparatus connected with the electrical wiring without setting off the alarm.

The key serving to turn the switch is so constructed that within the sector between 0° and 90°, it can move both clockwise and counterclockwise, but after it reaches 180° where the key may be removed leaving the vehicle in the condition of "service alarm," on any advance from this position to the 360° point, the key cannot be turned counterclockwise. When the switch has reached 360° the key may then be withdrawn from the lock. Owing to the foregoing circumstances at the 270° switch position, the switch contact positions must be identical with those existing at the 90° position, namely, to effect drive, alarm, and rear door protection of the vehicle.

To carry out the "service alarm" function, the vehicle must be capable of being driven, and bearing this in mind the switch contacts 2, 6, 9, 10, and 12, must be closed when the switch has arrived at the 180° sector position.

With the switch contact 12 closed in switch positions 150° and 180° current from the auxiliary battery 27 passes through a lead 31 and the leads 32, 20, to set the auxiliary alarm and maintain the relay coil 19 energized for operation if the circuit through the bank of microswitches is broken by opening the normally closed switch 21z which serves to alarm the rear door of the vehicle.

When the switch is turned into the 30° or the 330° position, the switch contacts 3, 4, 5, 8, and 9 are closed.

The closure of the bridged contact switch 3 allows current to pass from the battery 10, through the lead 11 to the relay coil 19, the normally closed microswitches 21a . . . 21z, and through the closed switch contacts 4, the coil 34, the fuse or circuit breaker 24, the closed switch contacts 8, through the lead 33, to earth.

The closure of the bridged contact switch 5 allows current to pass from an auxiliary battery 27, through the leads 31 and 28 into the relay arm 25. The current flow through the relay coil 19 and into the two arms 18 and 25 draws these arms upwards away from their normal closed circuit to energize the relay 17, and thereby set the alarm.

Turning the switch to the 60° or the 300° positions does not have any additional effect on the situation.

When the switch is turned into the 90° or 270° position, the switch contacts 2, 6, and 13, are closed. This allows "drive" of the vehicle, the alarm to be actuated if the vehicle itself is being tampered with, and the alarm to be also actuated if the goods within the vehicle are being tampered with by access through the rear door. The closure of the bridged contact switch 2 allows a passage of current from the battery 10 through the lead 11, the ignition switch 12, the ignition coil 34, and thence over the lead 14 across the bridged contact switch 6, through the distributor 15 and along the lead 16 to earth, thereby completing the drive circuit. By the closing of switch contact 13 in the position 90° and 270°, the alarm is set to be operated by closing of switch 2. Contact 13 draws current through the lead 35 to pass through the normally open microswitch Z at the rear door of the commercial vehicle to actuate a horn relay in dependency on its polarity.

The switch positions, when the switch is turned into 240° or 120°, are not in use, as also is the case when the switch is turned to 210°. For the switch positioned at 150° the switch contact points 9, 10, 11, and 12 are closed and the auxiliary alarm is in the first stage of being set.

The closure of contact switches 10 and 11 at this position enables the passage of current from the auxiliary battery 27 to the switch contact 11, through the relay coil 19, to microswitch 21z through switch contact 10 to the neutral of the battery 27.

On turning the switch position from 150° to 180°, switch contact 11 opens. Current is then maintained through switch contact 12 which is closed at 150° position and remains closed moving through to the 180° position to maintain the relay in an energized condition.

Switch contact 9 is closed at the 150° and 180° switch positions to pass current along lead 28 to relay arm 25, to timer 30, to sound alarm 26, if relay coil is deenergized.

If the switch 21z is opened relay arms 18 and 25 return to their deenergized condition and current will pass from battery 27 to sound both alarms 23 and 26.

After the switch is in 180° position the key is then turned to the 270° position to effect drive with the rear door alarm through contact switch 13.

A further switch Z which operates in conjunction with the closing and opening of the rear door or doors is fitted to protect the goods and draws current from the main battery to operate a relay associated with the main horn.

When the rear door is closed switch 21z is closed and switch Z is open. While switch is in position 90° and 270° switch contact 13 is closed, drawing negative (or positive) current depending on the polarity from the battery 10 through the switch 13 to Z.

By the opening of the rear door the horn is actuated and notifies the driver that the rear door has been opened.

If it is desired to effect a legal entry into the protected part of the vehicle whilst in alarm, the switch Y, lying parallel across the microswitch 21z, is closed. By this means the switch 21z may be opened without setting off the alarm.

Various minor constructional modifications may be made in the circuit without affecting the invention which is limited solely by the limitations in scope determined by the following claims.

What is claimed is:

1. An alarm system for motor vehicles comprising in combination:
    A. a multicontact, multipositioned key activated switch;
    B. a source of electric current supplied to said switch;
    C. a relay powered by said source through said switch;
    D. auxiliary switch means for deactivating said relay positioned between said relay and said switch; and
    E. an alarm powered by said source through said relay, said alarm arranged to be disconnected when said switch is in a first position for removing said key, said alarm further arranged to be disconnected when said switch is in a second position for operating said motor vehicle, said alarm further arranged to be set when said switch is in a third position, and said alarm further arranged to be activated when said switch is in a fourth position and when said relay is deactivated by tampering with said auxiliary switch means.

2. The apparatus of claim 1 wherein said auxiliary switch means comprises the electrical system of said vehicle.

3. The apparatus of claim 1 wherein said auxiliary switch means is interposed in the mechanical system of said vehicle.

4. The apparatus of claim 1 wherein said source of current is the battery of said vehicle.

* * * * *